United States Patent [19]

Rohm et al.

[11] Patent Number: 4,705,055
[45] Date of Patent: Nov. 10, 1987

[54] APPARATUS FOR AUTOMATICALLY CLEANING EXTRUSION SCREENS IN JUICE FINISHING MACHINES AND THE LIKE

[75] Inventors: Robert F. Rohm, Yorba Linda; Ronald C. Bushman, Hacienda Heights, both of Calif.

[73] Assignee: Brown International Corporation, Covina, Calif.

[21] Appl. No.: 802,427

[22] Filed: Nov. 27, 1985

Related U.S. Application Data

[63] Continuation-in-part of Ser. No. 747,454, Jun. 21, 1985, abandoned.

[51] Int. Cl.<sup>4</sup> ............................ B08B 3/02; B08B 9/00
[52] U.S. Cl. .................................. 134/57 R; 100/112; 100/117; 134/167 R; 210/143; 210/411; 210/413; 241/74
[58] Field of Search ................. 134/57 R, 167 R, 171, 134/172, 170; 99/510; 210/143, 411, 413, 414; 241/74, 166; 100/112, 117, 127, 145–150

[56] References Cited

U.S. PATENT DOCUMENTS

| | | | |
|---|---|---|---|
| 3,235,188 | 2/1966 | Bradley | 241/74 |
| 3,370,527 | 2/1968 | Holbrook | 100/147 |
| 3,606,897 | 9/1971 | Tobin, III et al. | 134/170 X |
| 3,933,519 | 1/1976 | Koch et al. | 134/172 X |
| 4,439,320 | 3/1984 | Blok | 210/411 X |
| 4,585,019 | 4/1986 | Jacobson | 134/57 R |

Primary Examiner—Philip R. Coe
Attorney, Agent, or Firm—Paul A. Weilein

[57] ABSTRACT

A method and apparatus are disclosed for automatically cleaning extrusion screens in finishing machines of a type having a generally cylindrical perforated screen arranged in a housing, juice or the like laden with solids being introduced into the interior of the screen and urged against the screen by a screw element, paddle assembly, or the like to cause the juice to flow through the screen with the solids being retained on the screen. The cleaning method and apparatus comprise a cleaning unit with a plurality of spray nozzles arranged about the screen, the cleaning unit being moved back and forth along the screen by a reversing motor additionally controlled by suitable limit switches. The method and apparatus of the invention are preferably adapted for causing relatively increased cleaning action adjacent a solids outlet end of the screen to better remove larger amounts of juice solids or pomace deposited on that portion of the screen.

8 Claims, 6 Drawing Figures

APPARATUS FOR AUTOMATICALLY CLEANING EXTRUSION SCREENS IN JUICE FINISHING MACHINES AND THE LIKE

This is a continuation-in-part of application Ser. No. 747,454, filed June 21, 1985 by Robert F. Rohm and Ronald C. Bushman and entitled METHOD AND APPARATUS FOR AUTOMATICALLY CLEANING EXTRUSION SCREENS IN JUICE FINISHING MACHINES AND THE LIKE now abandoned.

BACKGROUND OF THE INVENTION

The present invention relates to apparatus for cleaning finishing machines of a type having a generally cylindrical screen for removing solids from juice or the like, and more particularly to such apparatus adapted for automatically cleaning extrusion screens of such finishing machines with little or no interruption in the normal operating cycle of the finishing machine. It is particularly contemplated that the apparatus of the present invention be employed in connection with the finishing of initial juices obtained from fruits, particularly citrus fruits, and vegetables such as tomatoes.

In the production of juices from various fruits and vegetables, juice extraction machines are commonly employed to first obtain an initial or raw juice containing substantial amounts of various solids such a rag, pulp from juice sacs, pectinous material, seeds, etc. Typical examples of juice extraction machines for obtaining initial or raw juice from various fruits and vegetables are disclosed, for example, in U.S. Pat. Nos. 2,631,625 and 4,170,935. The construction and method of operation contemplated for these machines is not of particular concern in connection with the present invention. Rather, the above-noted patents are referred to herein only for the purpose of demonstrating an exemplary source for the initial or raw juice with which the method and apparatus of the present invention are contemplated for use.

In order to produce commercially desirable juice from the initial or raw juice obtained from juice extraction machines, it is generally necessary or desirable to first remove a substantial portion of the solid components from the initial juice to provide a so-called finished juice.

A typical commercial machine for converting initial or raw juice to a finished juice, characterized as being a screw-type finisher, is disclosed, for example, in Holbrook U.S. Pat. No. 3,370,527. In a finisher of this type, the initial juice or slurry is introduced into the interior of a stationary cylindrical screen. The screen is in effect a thin-walled cylindrical member, preferably formed from stainless steel, with very small, closely spaced extrusion openings formed about its circumference and along its length.

A rotary screw is designed to have a fairly close tolerance fit within the screen. The screw is rotated to conduct the initial juice or slurry along the length of the screen, forcing a liquid juice portion through the screen while a substantial portion of solids from the initial juice is retained upon the screen and conducted to a point of discharge. The finishing machine of the above-noted patent is described in greater detail below.

It is to be noted that the present invention is not limited to a particular type of finisher or even to a general screw-type finisher as described above. For example, screw-type finishers tend to be of two different types. In one type, the screen and the outside diameter of the relatively rotating screw element are tapered with the smaller diameter being located at the discharge end. The rotary screw is tapered and the pitch of its flights varies so that the cross sectional area between the flights decreases at the discharge end.

In other screw-type finishers, the screen and the outside diameter of the screw are cylindrical. The rotary screw may be conical with the large diameter at the discharge end, or the rotary screw may be cylindrical.

In both of the above screw-type finishers, a pneumatically operated pulp escape valve is provided at the discharge end of the screen. As the fluid or juice component from the initial juice or slurry passes through the screen, substantial solids build up on the screen, particularly at the discharge end. The valve is commonly regulated in order to properly control the slurry solids.

In yet another type of finisher, commonly referred to as a paddle-type finisher, the initial juice or slurry is also introduced into the interior of a stationary screen which is conical or cylindrical in shape. A paddle device is rotated within the interior of the cylindrical screen and serves a similar function as the screw element in the screw-type finishers for conveying the initial juice or slurry along the screen. A liquid portion of the juice passes through the screen with remaining solids being conducted along the interior of the screen toward a solids outlet.

In any event, regardless of the particular type of finishing machine employed, the solids from the intial juice tend to build upon the screen and to plug the openings, thus tending to interfere with its continued operation. In the past it has generally been necessary to shut down finishing operations of the machines and to remove the solids from the screen, for example, by manually directing fluid or liquid at the screen in order to clean the openings in the screen and to rinse solids from the surfaces of the screen.

Although these manual cleaning steps have been found suitable for conditioning the finishers for continued operation, they have been found to be unsatisfactory because of lost operating time for the finishing machines and overall efficiency. This loss in efficiency is particularly apparent when large numbers of finishing machines are employed in single installations. In such situations, the need to individually shut down the finishing machines and carry out manual operations as described above has been particularly time consuming and inefficient.

In any event, there has been found to remain a need for an improved method and apparatus for cleaning such finishing machines.

SUMMARY OF THE INVENTION

It is therefore an object of the invention to provide apparatus for cleaning screens of juice finishing machines while avoiding problems of down time and inefficiency.

In describing the apparatus of the present invention, reference is made to cylindrical screens arranged within housings of various finishing machines. It is, of course, to be understood that such cylindrical screens are intended to include a variety of configurations such as conical or cylindrical shapes and not merely a cylindrical screen of uniform diameter of configuration.

It is a further object of the invention to provide apparatus for cleaning cylindrical screens arranged within housings of various finishing machines which include means for introducing initial juices or the like into an interior portion of the screen. Means such as paddle units or screw elements, for example, are employed to facilitate passage of a liquid portion of the initial juice through the screen while a substantial portion of the solids from the initial juice is retained upon the screen and conducted toward a separate solids outlet.

It is an even further object of the invention to provide such apparatus for cleaning cylindrical screens of finishing machines of the type referred to above wherein the cleaning is carried out automatically with little or no interruption of the normal operation of the finishing machine. In this regard, the invention preferably contemplates apparatus wherein cleaning means comprising a plurality of nozzles or the like are arranged about the circumference of the screen, the nozzles being movable along the length of the screen in order to clear the openings in the screen and to rinse solids from the screen surfaces.

It is an even further related object of the invention to provide such apparatus for automatic cleaning of finishing machines wherein first limit switch means are employed to reverse operation of a motor driving the cleaning means as the cleaning means approaches an axial end of the screen, thereby causing the cleaning means to move back and forth along the length of the screen. A second limit switch is preferably employed for terminating operation of the motor and completing the cleaning operation as the cleaning means approaches a selected position relative to the screen.

It is yet another object of the invention to provide such apparatus for automatic cleaning of finishing machines wherein the cleaning means provides increased cleaning action adjacent a solids outlet end of the finisher screen in order to better remove larger amounts of juice solids or pomace deposited on that portion of the screen.

Additional objects and advantages of the invention are made apparent in the following description having reference to the accompanying drawings.

DESCRIPTION OF THE PREFERRED EMBODIMENT

The present invention is directed toward apparatus for automatically cleaning cylindrical screens in finishing machines of various types adapted for separating liquid portions from solid portions of initial juices and the like. As disclosed below, the apparatus of the present invention comtemplate the automatic cleaning of the cylindrical screens of such finishing machines through the use of nozzles or the like adapted for clearing openings in the screen and for washing solids from the surfaces of the screens.

Cleaning apparatus constructed in accordance with the present invention, and operable in accordance with a method of using the invention, is illustrated in the drawings and described in greater detail below.

Figure 1:
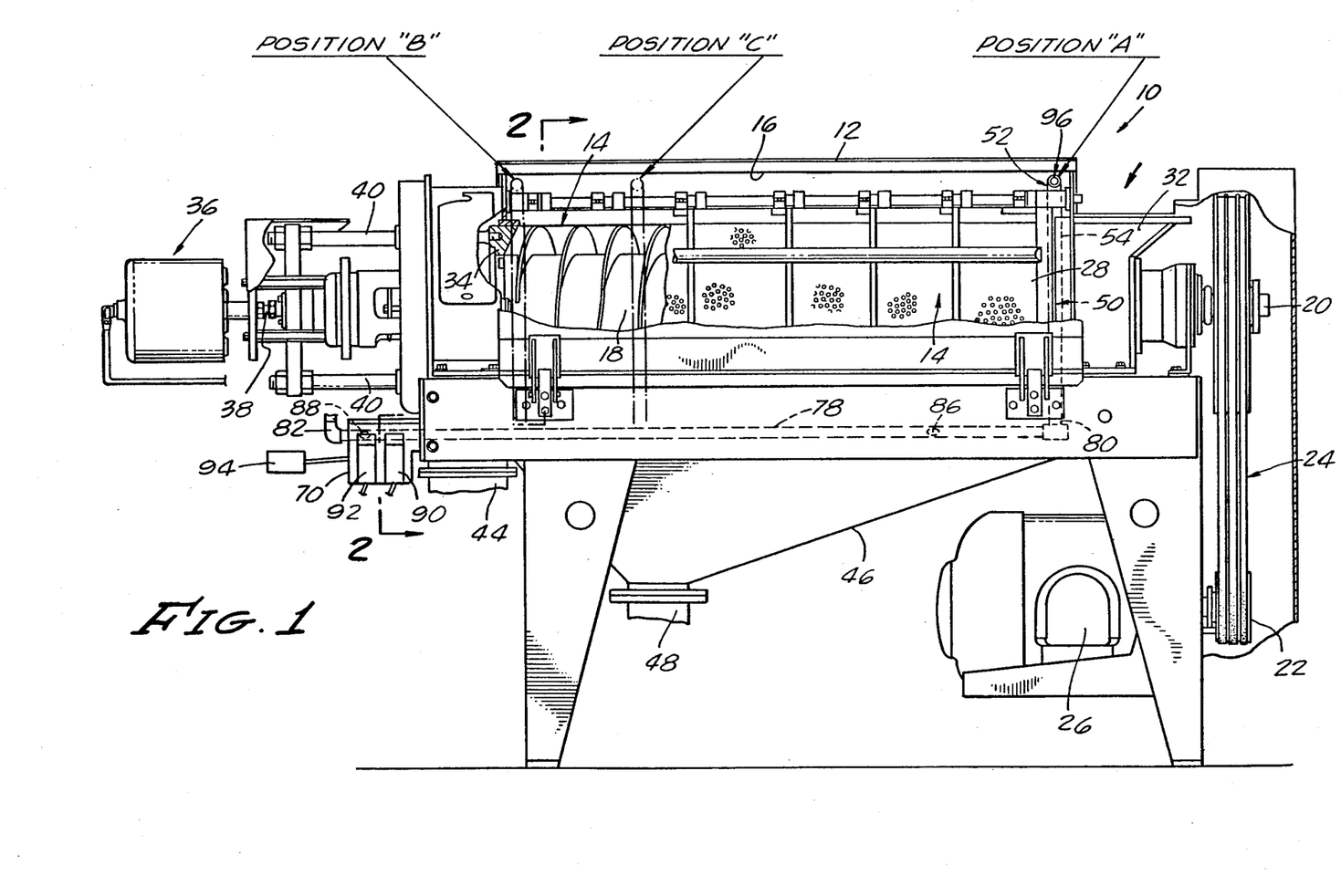
FIG. 1 is a side view in elevation, with portions being broken away, of a finishing machine constructed according to the prsent invention.

Referring now to the drawings and particularly to FIG. 1, a finishing machine, generally indicated at 10, is of a type contemplated for use with the cleaning method and apparatus of the present invention. The finisher 10, apart from the cleaning method and apparatus, is similar to that summarized above and described in greater detail in the above-noted U.S. Pat. No. 3,370,527. The construction and operation of the finisher 10 is described briefly below only for the purpose of demonstrating a setting for the cleaning method and apparatus of the invention.

Figures 2, 4, 5:
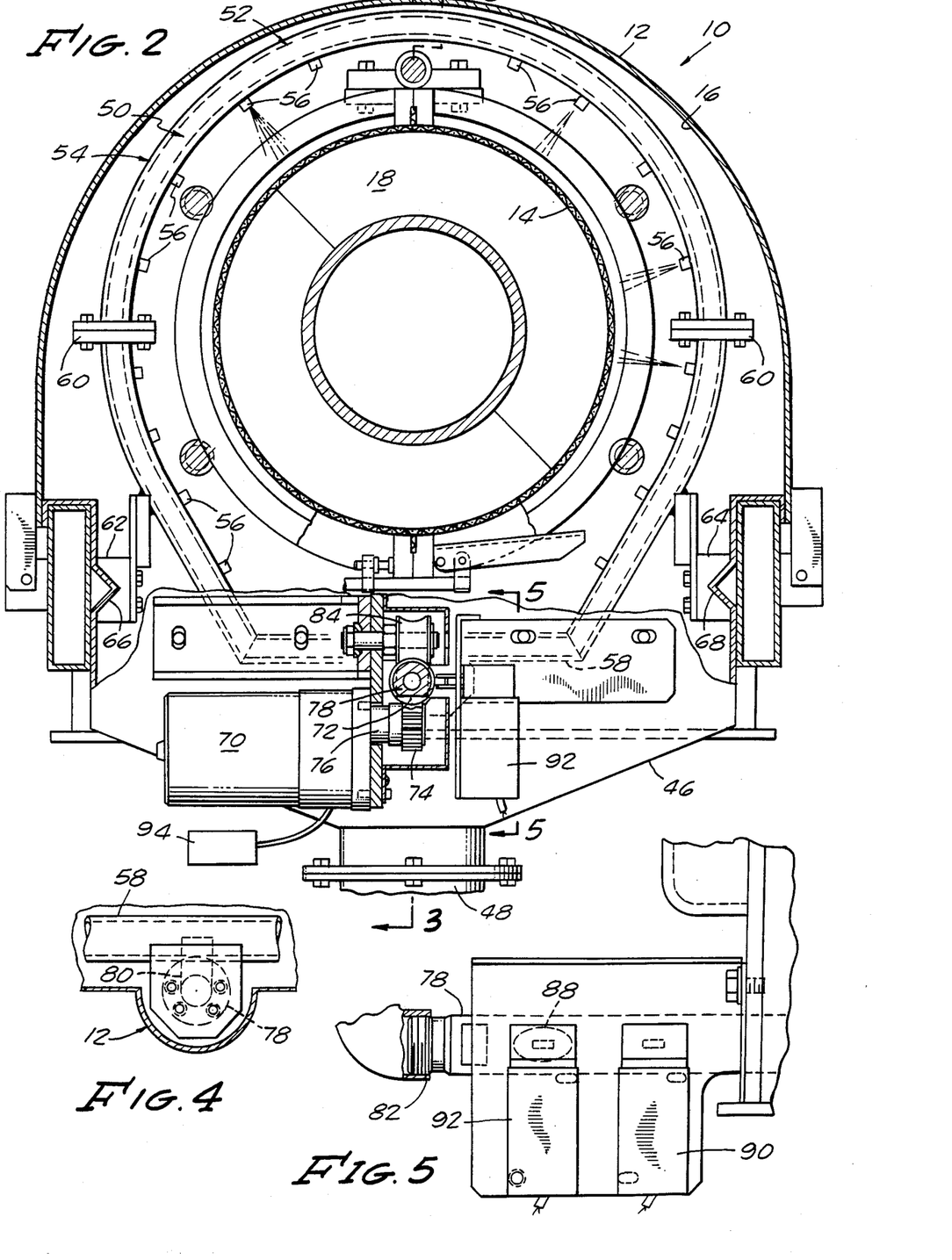
FIG. 2 is an enlarged vertically sectioned view of the finishing machine of the present invention, taken along the staggered section line 2—2 of FIG. 1.
FIG. 4 is a fragmentary view of a portion of the finishing apparatus taken along section line 4—4 of FIG. 3.
FIG. 5 is an enlarged fragmentary view of another portion of the finishing apparatus taken along section line 5—5 of FIG. 2.

Continuing with particular reference to FIG. 1, the finisher 10 includes a housing 12 within which is arranged a cylindrical screen 14. The cylindrical screen 14 is of two-part construction, as shown in FIG. 2, in order to facilitate its removal from and replacement in the finisher or to facilitate changing to screens with different size openings, for example. In any event, the cylindrical screen 14 is inwardly spaced from interior portions 16 of the housing 12.

In the finishing machine summarized in connection with the above-noted patent, a screw element 18 is arranged within the cylindrical screen 14 and is mounted for rotation therein. The screw element 18 is driven in rotation through pulleys 20 and 22 and drive belts 24 by a suitable motor 26.

Figure 3:
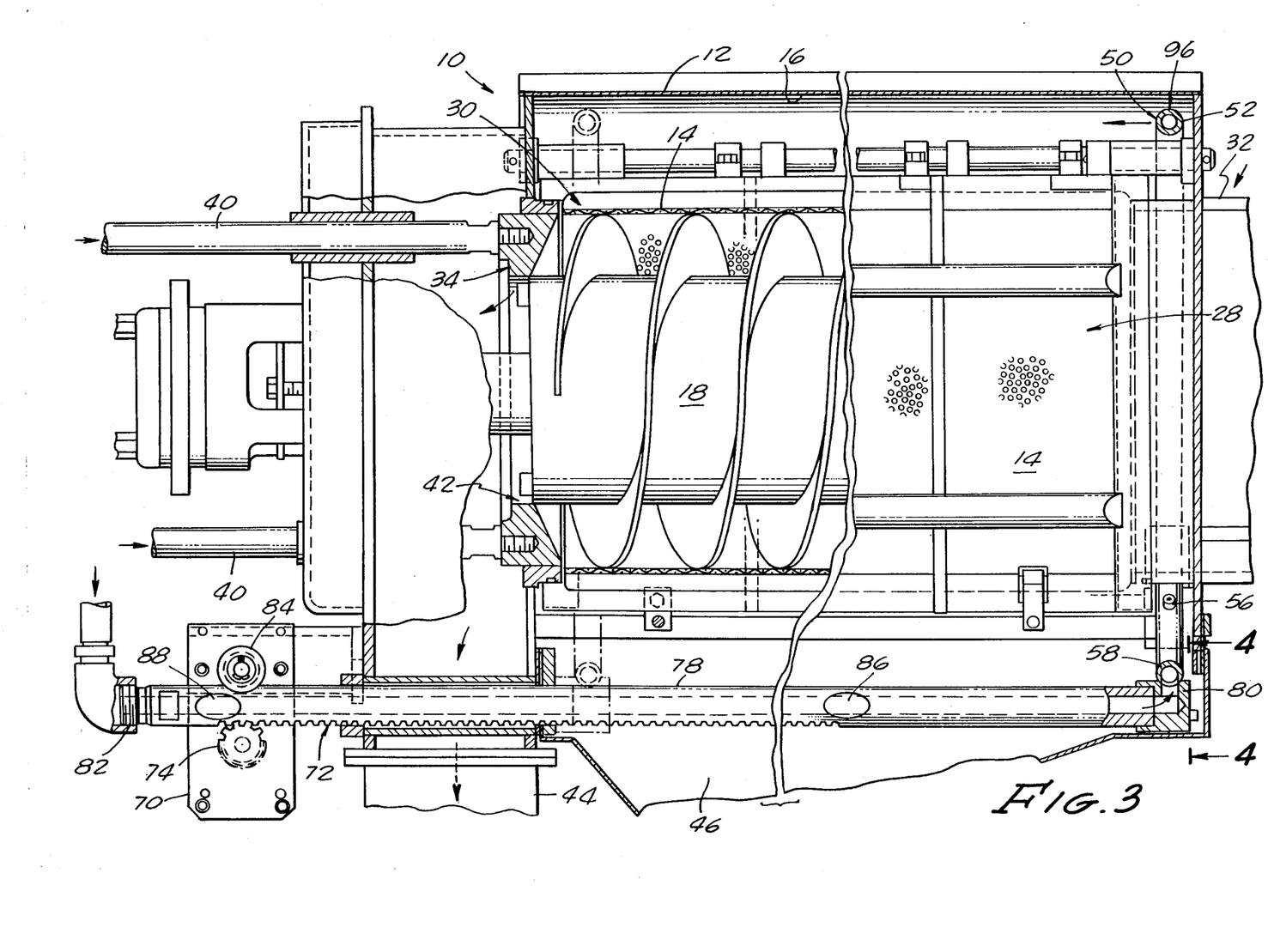
FIG. 3 is an enlarged fragmentary side view in elevation with parts in section, similar to FIG. 1 while illustrating internal components of the finishing machine in greater detail.

Opposite ends 28 and 30 of the cylindrical screen 14 are open and form inlet means for initial juice or the like and a solids outlet respectively (see FIG. 3). Initial juice or the like is introduced into the interior of the cylindrical screen 14 through an inlet hopper 32. At the outlet end 30 of the cylindrical screen 14, a cone element 34 is adjustably urged toward the screw element 18 by an air cylinder assembly 36 (see FIG. 1) interconnected with the cone element 34 by a piston rod 38 and a plurality of parallel bars 40. The operation of these components is described in substantially greater detail in the above-noted Holbrook patent.

Initial juice entering the inlet end 28 of the cylindrical screen through the inlet hopper 32 comprises a liquid portion and a solid portion. As the initial juice is urged leftwardly, as viewed in FIG. 1, through the cylindrical screen 14 by operation of the screw element 18, liquid portions of the juice are forced radially outwardly through the openings in the perforated screen 14. Solid portions of the initial juice are retained within the screen and are urged toward the outlet end 30 of the screen where they pass from the interior of the screen through passage 42 into a discharge chute 44. Those features of the finishing machines can be seen in the enlarged view of FIG. 3.

During operation of the finishing machine 10, a liquid portion of the intial juice passing radially outwardly through the perforated screen 14 is collected in a discharge chute 46 of the housing 12 and directed toward a liquid outlet 48.

During normal finishing operations of the machine 10, solids tend to build up on the surfaces and within the openings of the perforated cylindrical screen 14. In order to avoid the need for shutting down operation of individual finishing machines or large banks of numbers of such machines, the present invention provides automatic cleaning apparatus generally indicated at 50 and arranged within the interior of the housing 12 of the finishing machine.

The automatic cleaning apparatus 50 includes a cleaning assembly or wash ring 52 comprising a tubular horseshoe-shaped portion 54 extending generally circumferentially about the cylindrical screen 14 in the region between the screen 14 and the housing 12. The cleaning assembly 52 is also provided with a plurality of nozzles 56, as best seen in FIG. 2, which are supplied with cleaning fluid from the tubular horseshoe-shaped portion 54. The lower ends of the tubular horseshoe-shaped portion 54 are connected with a hollow tube 58. The tube 58 serves to interconnect the horseshoeshaped portion 54 and the nozzles 56 with a source of cleaning fluid as described in greater detail below. The tubular horseshoe-shaped portion 54, the nozzles 56 and the hollow tube 58 comprise the wash ring 52 as referred to above. The horseshoe-shaped portion 54 is formed from two portions which are interconnected by flange plates 60 as best seen in FIG. 2.

The cleaning assembly or wash ring 52 is supported about the periphery of the cylindrical screen 14 by mounting brackets 62 and 64. The brackets 62 and 64 are in turn slidably mounted on V-shaped trcks 66 and 68 so that the entire cleaning assembly or wash ring 52 is capable of reciprocating movement axially of the cylindrical screen 14.

Reciprocating movement of the cleaning assembly 52 is conrolled by a reversible motor 70 coupled with the cleaning assembly 52 through rack and pinion means respectively indicated at 72 and 74 as best seen in FIG. 3. The pinion means 74 is formed on an output shaft 76 for the motor 70. Otherwise, the construction of the rack and pinion means and the manner in which it couples the motor 70 with the cleaning assembly 52 is described in greater detail below.

Cleaning liquid or fluid for the nozzles 56 of the cleaning assembly 52 is supplied by an elongated actuator pipe or tube 78 which also preferably forms the rack means 72. Referring to FIGS. 1, 3 and 4, the actuator tube 78 is interconnected with the hollow tube 58 of the cleaning assembly 52 by a short tube 80 as viewed, for example, in FIG. 1. The other end 82 of the pipe 78 extends from the housing 12 to engage the rack means 72 with the pinion means 74 (see FIGS. 2 and 3). The end 82 of the pipe 78 is connected with a source of cleaning fluid or liquid (not shown). The rack means 72 on the pipe 78 is maintained in engagement with the pinion means 74 by an idler roller 84 engaged with the pipe 78 opposite the pinion means 74.

Limits of travel for the cleaning assembly 52 relative to the cylindrical screen 14 are established by detents in the form of indentations or cam surfaces as indicated at 86 and 88 in the surface of the elongated actuator pipe 78 (see FIG. 3). The positions of the detents 86 and 88 on the pipe 78 and the spacing therebetween is determined by the extent of travel to be allowed for the cleaning assembly 52 along the axis of the cylindrical screen 14. Referring to FIGS. 1 and 5, the detents 86 and 88 are arranged for interaction with respective limit or microswitches 90 and 92 mounted outside the housing 12 of the finishing machine adjacent reversible drive motor 70.

Both limit switches 90 and 92 are operatively interconnected with the reversible drive motor 70. In addition, the reversible drive motor 70 is provided with an actuating switch 94 which, as hereinafter described in greater detail, can take a variety of different forms. Thus, the actuating switch 94 is adapted for arrangement either in a remote location suitable for controlling a large number of similar finishing machines, in a position adjacent the finishing machine 10, or even within one of the limit switches 90 and 92.

The detents 86 and 88 are positioned along the actuator pipe 78 for respective interaction with the limit switch assemblies 90 and 92 respectively. The detent 86 is positioned on the actuator pipe 78 so that as the cleaning assembly 52 is moved leftwardly under the influence of the actuator pipe 78, its leftward travel, as viewed for example in FIG. 1, is limited as the detent 86 approaches and actuates the limit switch 90.

The limit switch 90 is of a type so that, upon engagement by the detent 86, it causes reversing operation of the motor 70. The cleaning assembly 52 is then driven rightwardly along the cylindrical screen 14, again as viewed for example in FIG. 1, until it approaches an end position as generally indicated at 96 in FIG. 1.

As the cleaning assembly 52 approaches the end position 96, the other detent 88 approaches and actuates the other limit switch 92, as is illustrated in FIG. 5, interrupting operation of the motor 70 with the cleaning assembly 52 in the end position 96. At the same time, the motor 70 is again conditioned so that upon commencement of a subsequent cleaning operation through the actuating switch 94, the motor 70 initially operates in a direction of rotation for again moving the cleaning assembly 52 in a leftward directin as viewed, for example, in FIG. 1.

Although the method of operation for accomplishing automatic cleaning in accordance with the invention is believed apparent from the preceding description, it is further described below in order to assure a more complete understanding of the invention.

Figure 6:
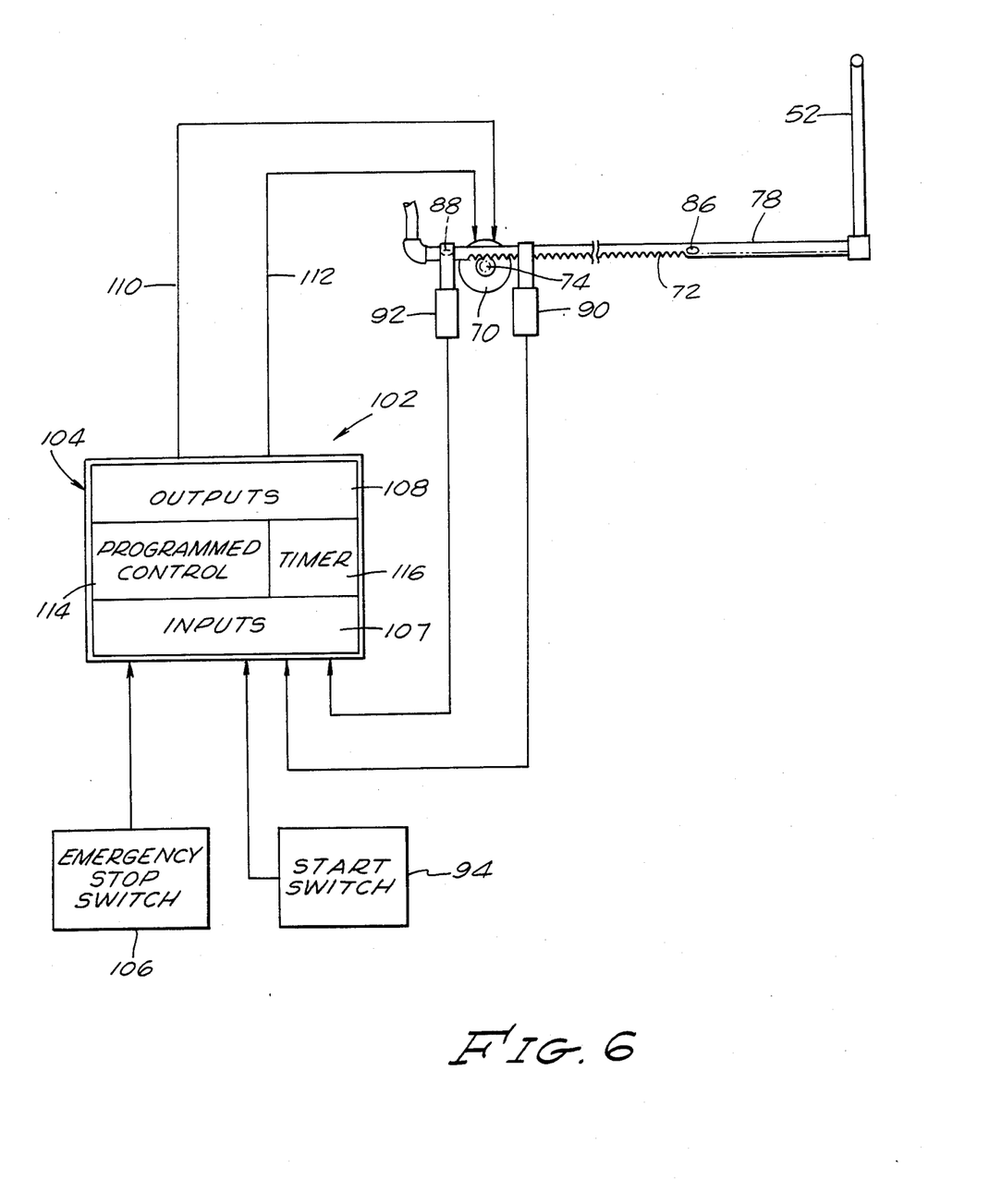
FIG. 6 is a fragmentary schematic representation of a control circuit which can be employed in connection with the finishing machines of FIGS. 1–4 for accomplishing a preferred mode of cleaning in the finishing machine.

A preferred control assembly for regulation the cleaning operation is illustrated in FIG. 6 and generally indicated at 102. The control assembly 102 includes the motor 70, limit switches 90 and 92 and the actuating switch 94 described and also illustrated, for example, in FIG. 1.

The purpose of the control assembly 102 is to provide an important optional mode of operation for causing increased cleaning action adjacent the solids outlet end of the screen in order to better remove relatively large amounts of juice solids or pomace deposited on that portion of the screen.

The solids portion of the unfinished juice increase in concentration as they are retained by the finisher screen and move axially toward the solids discharge end 30 of the screen. These solid portions of the juice, also termed "pomace", thus tend to become compacted near the discharge end of the finishing machine in a zone on the screen commonly referred to as the "pad" area. This pad area of the screen is generally located between positions B and C illustrated in FIG. 1 and further identified below.

The axial extent and quantity of this pad of pomace will vary somewhat depending on the design and operating speed of the screw and upon the air pressure which is applied to the pomace discharge valve of the finisher machine. The amount of compression which occurs in this pad area will in turn determine the amount of juice left in the pomace.

In order to prevent blockage of the extrusion screen in the pad area referred to above, it is desirable to provide means for causing increased cleaning of the pad area of the screen preferably by moving the wash ring 52 in a number of independent reciprocating cycles along the pomace pad area of the screen between positions B and C in addition to and independently from reciprocation of the wash ring along the full length of the extrusion screen between positions A and B.

To accomplish increased cleaning as described above, the control assembly 102 includes a programmable controller 104 coupled respectively with the actuating switch 94, the limit switches 90 and 92 and the motor 70. Optionally, the programmable controller 104 may also be coupled with an emergency stop switch 106 to permit manual override of the operation when desired or necessary.

The controller 104 may be of generally conventional design. However, the controller 104 preferably includes an input portion 107 coupled respectively within the limit switches 90 and 92 as well as the actuating switch 94 and emergency switch 106 to receive signals from those components. The controller 104 also includes an output portion 108 coupled with the motor 70 by lines 110 and 112 for causing operation of the motor 70 in either clockwise or counterclockwise rotation.

The controller 104 also includes a programmed control portion 114 including timer means 116 for permitting desired variation in the cleaning operation described below. Generally, the programmed control portion 114 includes means for reversing operation of the motor 70 a predetermined number of times as described below in order to achieve the desired amount of cleaning within the pad area of the screen between the positions B and C.

Referring also to FIG. 1, three operating positions for the wash ring 52 include a first position A corresponding to the end position 96 described above. Position B also illustrated in FIG. 1 corresponds to travel of the wash ring 52 substantially toward the outlet end 30 of the screen. A third position C is indicated in adjacent and spaced apart relation from position B so that the spacing between positions B and C tend to encompass the pad area referred to above where an increased buildup of solids or pomace tends to occur.

During operation of the finishing machine 10, it is operated in a generally well-kno portion of the juice solids are retained within the screen and directed toward an outlet opening 42 and discharge chute 44.

Through use of the automatic cleaning apparatus 50 provided by the present invention, it is thus possible to clean the cylindrical screen 14 at selected intervals determined either by an operator or pre-established according to the operating cycle of the finishing machine 10. In any event, the cleaning operation is commenced by actuation of the switch 94 which sets the motor 70 in operation to rotate the pinion 74. This causes the rack 72 to shift the cleaning assembly 52 leftwardly, as viewed for example in FIG. 1. The actuator pipe 78 is interconnected with the above-noted source of cleaning fluid so that cleaner is supplied to the cleaning assembly or wash ring 52 for passage through the nozzles 56 as the cleaning assembly 52 reciprocates in back and forth travel relative to the cylindrical screen 14.

As the actuator pipe 78 and cleaning assembly 52 move leftwardly through the housing 12 and as the cleaning assembly 52 approaches the left end of the cylindrical screen 14, the first detent 86 enters into engagement with the first limit switch 90 causing the motor 70 to reverse direction. Thereafter, the motor 70 acts through the rack and pinion means 72, 74 to shift the actuator pipe 78 and the cleaning assembly 52 in a rightward direction again as viewed, for example, in FIG. 1.

As the cleaning assembly or wash ring 52 approaches the end position 96 adjacent the inlet end 28 of the housing 12, the second detent 88 engages and actuates the second limit switch 92. The switch 92 thereupon interrupts operation of the motor 70 and conditions it to commence a subsequent cleaning operation. Thus, the cleaning apparatus 50 of the present invention serves to permit automatic cleaning of the screen 14 in the manner described above.

The automatic cleaning apparatus 50 provides an additional advantage in that the cleaning cycle may be initiated either adjacent the individual finishing machine 10 or from a central control panel (not shown) adapted for regulating operation of a relatively large number of similar finishing machines such as that illustrated in FIG. 1. In any event, the actuating switch 94 is provided adjacent the location desired for initiating the cleaning operation.

When the cleaning cycle is controlled by the controller 104 of FIG. 6, the cleaning operation is again initiated through the actuating switch 94. The controller 104 thereupon initiates operation of the motor 70 for causing the wash ring 52 to travel from position A in FIG. 1 toward position B at the other end of the screen.

As the wash ring 52 approaches position B, the limit switch 90 is actuated and causes the controller 104 to reverse operation of the motor 70. As the motor 70 reverses and causes the wash ring 52 to travel toward position A, the timer 116 is also actuated. As the wash ring 52 passes from position B toward position C in a predetermined amount of time, the timer 116 again causes the controller 104 to reverse operation of the motor 70 so that the wash ring 52 again travels toward position B.

The timer 116 can be set to repeat cycling of the wash ring 52 between positions B and C for a predetermined number of time. After completion of the predetermined number of cycles established by the timer 116, the motor 70 is allowed to continue operation with the wash ring 52 returning all the way to the end position indicated at both 96 and A. Thereupon, the limit switch 92 is actuated, causing the controller 104 to terminate operation of the motor 70 with the wash ring at position A.

In a typical application, the timer 116 may be set to cause the wash ring to traverse the pad area between positions B and C approximately four or five times, for example, before returning the wash ring to position A. In this manner, increased cleaning occurs between positions B and C to remove the greater amount of solids from that portion of the screen.

There has thus been described a preferred method and apparatus for accomplishing automatic cleaning of a finishing machine of the type described above. Numerous variations and modifications will be apparent from the description. Accordingly, the invention is defined only by the following appended claims.

We claim:

1. Cleaning apparatus for finishing machines of a type having a generally cylindrical perforated screen arranged in a housing, inlet means for introducing juice or the like laden with solids into the interior of the screen, means for urging the solids-laden juice against the screen with first outlet means outside the screen for receiving finished juice passing through the perforated screen and second outlet means for receiving solids retained within the interior of the screen and separated from the finished juice, portions of the screen adjacent the second outlet means being subject to increased solids buildup, comprising:
   a cleaning ring including spray nozzles arranged circumferentially about the screen,
   means mounting the cleaning ring for reciprocating movement back and forth along the axis of the screen,
   reversing motor means for driving the cleaning ring back and forth along the screen,
   means for initiating operation of the motor means to commence a cleaning operation,
   first limit switch means operatively coupled with the motor means and comprising means for sensing movement of the cleaning ring toward an axial end of the screen adjacent the second outlet means, the first limit switch means being operable for reversing operation of the motor means,
   control means for causing the cleaning ring to automatically cycle back and forth adjacent the screen portions subject to increased solids buildup, and
   second limit switch means operatively coupled with the motor means and comprising means for sensing movement of the cleaning ring toward a selected end position of the screen opposite the second outlet means, the second limit switch means being operable for terminating operation of the motor means with the cleaning ring in the selected end position.

2. The cleaning apparatus of claim 1 further comprising elongated rack means coupled with the cleaning ring and extending parallel to the axis of the screen and the mounting means, pinion means being arranged in engagement with the rack means and coupled with the motor means.

3. The cleaning apparatus of claim 2 wherein the rack means is formed on a pipe coupled with the cleaning ring and also in communication with a source of cleaning fluid.

4. The cleaning apparatus of claim 3 wherein the first limit switch means is arranged adjacent the pipe, first detent means being formed on the pipe for actuating the first limit switch means.

5. The cleaning apparatus of claim 1 further comprising first and second detent means arranged for movement with the cleaning ring and respectively adapted for actuating the first and second limit switch means.

6. The cleaning apparatus of claim 1 wherein the means for urging the solids-laden juice against the generally cylindrical perforated screen comprises a rotary member including helical means for conveying said solids-laden juice along said screen.

7. The cleaning apparatus of claim 1 wherein the control means is adjustable.

8. The cleaning apparatus of claim 7 wherein the control means comprises adjustable timer means for causing the cleaning ring to cycle back and forth adjacent the portions of the screen subject to increased solids buildup.

* * * * *

UNITED STATES PATENT AND TRADEMARK OFFICE
CERTIFICATE OF CORRECTION

PATENT NO. : 4,705,055
DATED : November 10, 1987
INVENTOR(S) : Robert F. Rohm et al It is certified that error appears in the above-identified patent and that said Letters Patent are hereby corrected as shown below:

Column 6, line 43, "regulation" should read --regulating--.

Column 7, the paragraph beginning at line 49 and ending at line 52, should read as follows:

--During operation of the finishing machine 10, it is operated in a generally well-known manner for receiving initial juice through the inlet hopper 32. The screw element 18 is driven in rotation for causing a liquid portion of the initial juice to pass radially outwardly through the screen toward a liquid outlet 48. A substantial portion of the juice solids are retained within the screen and directed toward an outlet opening 42 and discharge chute 44.--

Signed and Sealed this

Twenty-ninth Day of March, 1988

*Attest:*

DONALD J. QUIGG

*Attesting Officer*   *Commissioner of Patents and Trademarks*